W. M. HALL.
Bee Hive.
No. 1,446.  Patented Dec. 27, 1839.
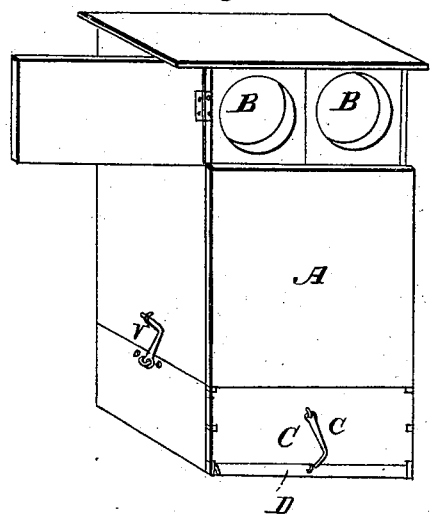
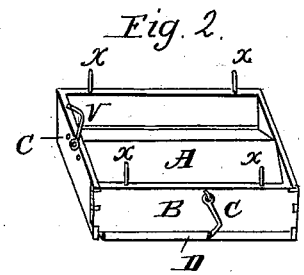
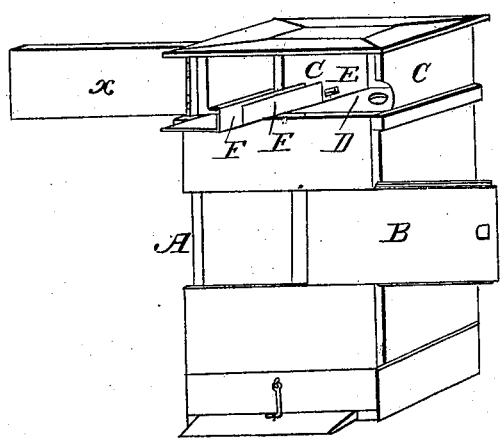
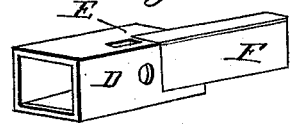

UNITED STATES PATENT OFFICE.

WM. M. HALL, OF WALLINGFORD, CONNECTICUT.

BEEHIVE.

Specification of Letters Patent No. 1,446, dated December 27, 1839.

*To all whom it may concern:*

Be it known that I, WILLIAM M. HALL, of Wallingford, in the county of New Haven, in the State of Connecticut, have invented a new and useful Improvement in the Construction of Beehives, and I call the hive so constructed a "Self-Protecting Beehive."

The object of my improvement is to so construct the hive, that it will discharge the worms that infest the hive, and other filth when the bees shall have disengaged them. To effect this I place a double inclined plane in the bottom or base of the hive, so formed as to discharge whatever falls upon it.

To enable others skilled in the art to make and use my invention I describe its construction and operation as follows, observing that my improved hive consists of three parts, viz: 1st, The hive in common form, twelve inches square more or less, as seen Figure 1, A; 2d, the chamber with communicating drawers on the top of the hive in common form for extracting surplus honey without destroying the bees, as seen in the accompanying drawings Fig. 1, B, B; 3d, the base, in which my improvement principally consists.

The base is a square frame of the size of the body of the hive, about four inches deep, without top or bottom, on which the hive rests, as seen in Fig. 1, C, being connected and held in place by dowels, as seen in Fig. 2, $x$ $x$, and hooks, as seen in Figs. 1, and 2, $v$. The front and rear sides of the base are narrower than the other sides by about an inch leaving room at the bottom for the play of the inclined planes, which form a bottom for the hive; consisting of two inclined planes, slanting from the top of the base to the bottom. These inclined planes consist of boards hung within the box of the base on pivots passing through the sides near the top edge of the center of the sides, and extending below the lower edge of the base in front and rear, with a play of about half an inch, as seen in Fig. 2, where A, represents the plane inclining to the front; B, the front of the base; C, the pivots on which the inclined planes hang; D, the projection of the inclined planes at the bottom of the base; E, the hook to close it tight against the bottom of the base when required. The protecting base thus formed, I have successfully used, and it may be applied to any hive of suitable size now in use; and when connected with the hive and placed in the apiary upon a platform of the same width as the base, an opening of half an inch admits freely the passage of the bees and ventilates the hive; and the inclination of the bottom causes the filth and worms separated from hive or comb by the bees, to roll out and fall to the ground from which they cannot return. The protecting base should be taken off during the process of hiving and replaced on the removal of the hive, and when the inclined planes are closed upon the sides of the base and hooked, the hive can be removed without disturbing the bees.

What I claim as my invention and improvement, is,

The protecting base, made with inclined planes substantially in the manner and for the purposes as above specified and for this only I solicit Letters Patent.

WM. M. HALL.

Witnesses:
SIMEON BALDWIN,
ROGER P. BALDWIN.